United States Patent
Fujimoto

(10) Patent No.: US 9,648,181 B2
(45) Date of Patent: May 9, 2017

(54) TOUCH PANEL DEVICE AND IMAGE PROCESSING APPARATUS

(71) Applicant: KYOCERA Document Solutions Inc., Osaka-shi, Osaka (JP)

(72) Inventor: Norie Fujimoto, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 33 days.

(21) Appl. No.: 14/972,122

(22) Filed: Dec. 17, 2015

(65) Prior Publication Data
US 2016/0179292 A1    Jun. 23, 2016

(30) Foreign Application Priority Data

Dec. 17, 2014  (JP) ................. 2014-255402

(51) Int. Cl.
| | |
|---|---|
| G06F 3/042 | (2006.01) |
| H04N 1/00 | (2006.01) |
| G06F 3/041 | (2006.01) |
| G06K 9/00 | (2006.01) |
| G06F 3/0488 | (2013.01) |
| G06F 3/0354 | (2013.01) |

(52) U.S. Cl.
CPC ..... *H04N 1/00392* (2013.01); *G06F 3/03547* (2013.01); *G06F 3/042* (2013.01); *G06F 3/0416* (2013.01); *G06F 3/04883* (2013.01); *G06K 9/0008* (2013.01); *G06K 9/00013* (2013.01); *G06F 2203/0338* (2013.01)

(58) Field of Classification Search
CPC .... G06F 3/03547; G06F 3/041; G06F 3/0416; G06F 3/042; G06F 3/0488; G06F 21/32; G06F 2203/0338; G06K 9/00006; G06K 9/00013; G06K 9/0008
See application file for complete search history.

(56) References Cited

U.S. PATENT DOCUMENTS 7,697,729 B2 * 4/2010 Howell ................. G06F 3/011
345/156
8,860,689 B2 * 10/2014 Zimchoni ............. G06F 21/32
345/173

(Continued)

FOREIGN PATENT DOCUMENTS

| JP | H04191920 A | 7/1992 |
|---|---|---|
| JP | H05241733 A | 9/1993 |

(Continued)

*Primary Examiner* — Joe H Cheng

(57) ABSTRACT

A touch panel device includes a touch panel unit, a fingerprint image capturing unit, a size derivation unit, and a control unit. The touch panel unit includes a display section that displays information about an operating instruction for a user. The touch panel unit detects the condition of contact with a user's finger to accept an input of the operating instruction. When the touch panel unit is pressed by the user's finger, the fingerprint image capturing unit captures an image of a fingerprint of the user's finger pressing the touch panel unit. The size derivation unit derives a size of the user's finger having pressed the touch panel unit from the fingerprint image captured by the fingerprint image capturing unit. The control unit controls the operating instruction based on the size of the user's finger derived by the size derivation unit.

9 Claims, 7 Drawing Sheets

(56) References Cited

U.S. PATENT DOCUMENTS

| | | | |
|---|---|---|---|
| 2001/0031075 A1* | 10/2001 | Fujii | G06K 9/6255 382/125 |
| 2008/0036743 A1* | 2/2008 | Westerman | G06F 3/038 345/173 |
| 2009/0160803 A1 | 6/2009 | Hashimoto | |
| 2009/0224874 A1* | 9/2009 | Dewar | G06F 21/32 340/5.53 |
| 2012/0154296 A1* | 6/2012 | Hinckley | G06F 3/0416 345/173 |
| 2012/0268246 A1* | 10/2012 | Liu | G06F 21/32 340/5.82 |
| 2013/0222277 A1* | 8/2013 | O'Hara | G06F 21/32 345/173 |
| 2013/0229370 A1 | 9/2013 | Shimizu et al. | |
| 2013/0251214 A1* | 9/2013 | Chung | G06Q 50/265 382/116 |
| 2013/0257758 A1* | 10/2013 | Huang | G06F 3/041 345/173 |
| 2013/0272586 A1* | 10/2013 | Russo | G06K 9/00087 382/124 |
| 2013/0300698 A1 | 11/2013 | Hashimoto | |
| 2014/0270417 A1* | 9/2014 | Lin | G06K 9/00154 382/124 |
| 2015/0074615 A1* | 3/2015 | Han | G06K 9/00033 715/863 |
| 2015/0186705 A1* | 7/2015 | Magi | G06K 9/0002 382/125 |
| 2015/0242673 A1* | 8/2015 | Singhal | G06K 9/00013 345/174 |
| 2016/0217313 A1* | 7/2016 | Cuti | G06F 3/0488 |
| 2016/0379036 A1* | 12/2016 | Long | G06K 9/00013 382/124 |
| 2017/0032169 A1* | 2/2017 | Pi | G06K 9/00026 |

FOREIGN PATENT DOCUMENTS

| | | |
|---|---|---|
| JP | H11327727 A | 11/1999 |
| JP | 2009151691 A | 7/2009 |
| JP | 2013182405 A | 9/2013 |
| JP | 2014048971 A | 3/2014 |
| JP | 2014167712 A | 9/2014 |

* cited by examiner

TOUCH PANEL DEVICE AND IMAGE PROCESSING APPARATUS

INCORPORATION BY REFERENCE

The disclosure of Japanese Patent Application No. 2014-255402 filed on Dec. 17, 2014 including the specification, drawings and abstract is incorporated herein by reference in its entirety.

BACKGROUND

The present disclosure relates to a touch panel device and an image processing apparatus.

Image processing apparatuses, typified by digital multi-function peripherals, read an image of an original document by using an image reading unit, and then emit light to a photoconductor provided to an image forming unit based on the read image to form an electrostatic latent image on the photoconductor. Then, a charged developer, including toner and other components, is applied onto the formed electrostatic latent image to make it into a visible image that is in turn transferred onto a sheet of paper and fixed. The sheet with the image fixed thereon is discharged outside the image forming apparatus.

Those image processing apparatuses are capable of selecting one of various functions, such as a copy function and a scanning function, and performing processing associated with the selected function. Setting of the processing and commands for performing the processing, for example a print command, are referred to as operating instructions that may be input through the use of hard keys, such as a numeric keypad and a start key, or may be input through a touch panel.

There are some well-known techniques regarding touch panel operations.

A typical information processing apparatus includes a display unit having a touch panel on its front surface, a movement amount calculation unit that calculates the movement amount of a touch operation based on a touch point at which the touch operation is performed on the touch panel and a touch release point at which the touch operation is released from the touch panel, an operation determination unit that determines whether the touch operation is a press operation or a gesture operation depending on the calculated movement amount, and a command recognition unit that recognizes whether a received command is a command corresponding to the press operation or the gesture operation.

A typical operation display device includes a touch panel unit that detects a touch position, a display unit, and a display control unit that executes a display according to a first display process on the display unit when the touch panel unit receives a first operation and executes both of the display according to the first display process and a display according to a second display process when the touch panel unit receives a second operation including an element of the first operation.

A touch point correcting method performed by a touch panel device is also known that includes causing a touch point capturing unit to capture a touch point at which an operator manipulates a touch panel to execute an operation, causing a difference calculation unit to compare coordinate values of the captured touch point with coordinate values of a display point displayed on a display screen to calculate the difference between the coordinate values, and calculating a new active reaction point on the touch panel based on the calculated difference data and relocating an active reaction point on the touch panel to the new active reaction point to correct the touch point.

In addition, a typical touch-panel input-error correcting method includes inputting coordinates on two planes in parallel with a touch surface and obtaining corrected input coordinates based on the two input coordinates.

SUMMARY

In one aspect of the present disclosure, a touch panel device includes a touch panel unit, a fingerprint image capturing unit, a size derivation unit, and a control unit. The touch panel unit includes a display section that displays information about an operating instruction for a user. The touch panel unit detects the condition of contact with a finger of the user to accept an input of the operating instruction. When the touch panel unit is pressed by the user's finger, the fingerprint image capturing unit captures an image of a fingerprint of the user's finger pressing the touch panel unit. The size derivation unit derives a size of the user's finger having pressed the touch panel unit from the fingerprint image captured by the fingerprint image capturing unit. The control unit controls the operating instruction based on the size of the user's finger derived by the size derivation unit.

In another aspect of the present disclosure, an image processing apparatus includes the aforementioned touch panel device and an image processing unit. The image processing unit processes images in accordance with an operating instruction input through the touch panel device.

DETAILED DESCRIPTION

Figure 1:
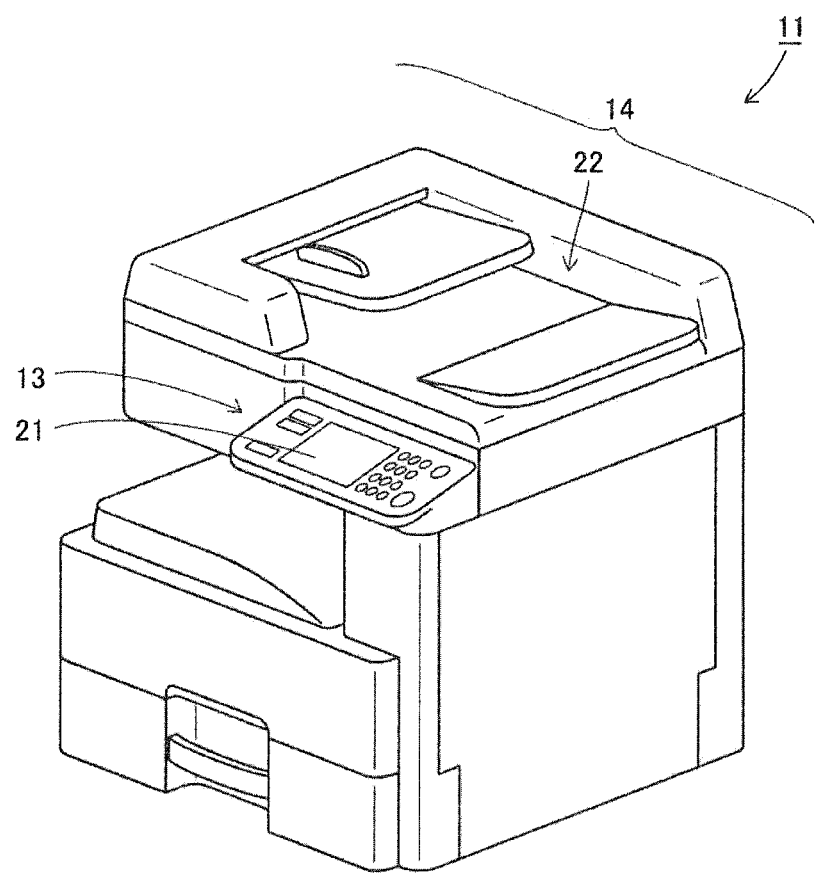
FIG. 1 is a schematic perspective view showing the appearance of a digital multi-function peripheral to which an image processing apparatus according to an embodiment of the disclosure is applied.
Figure 2:
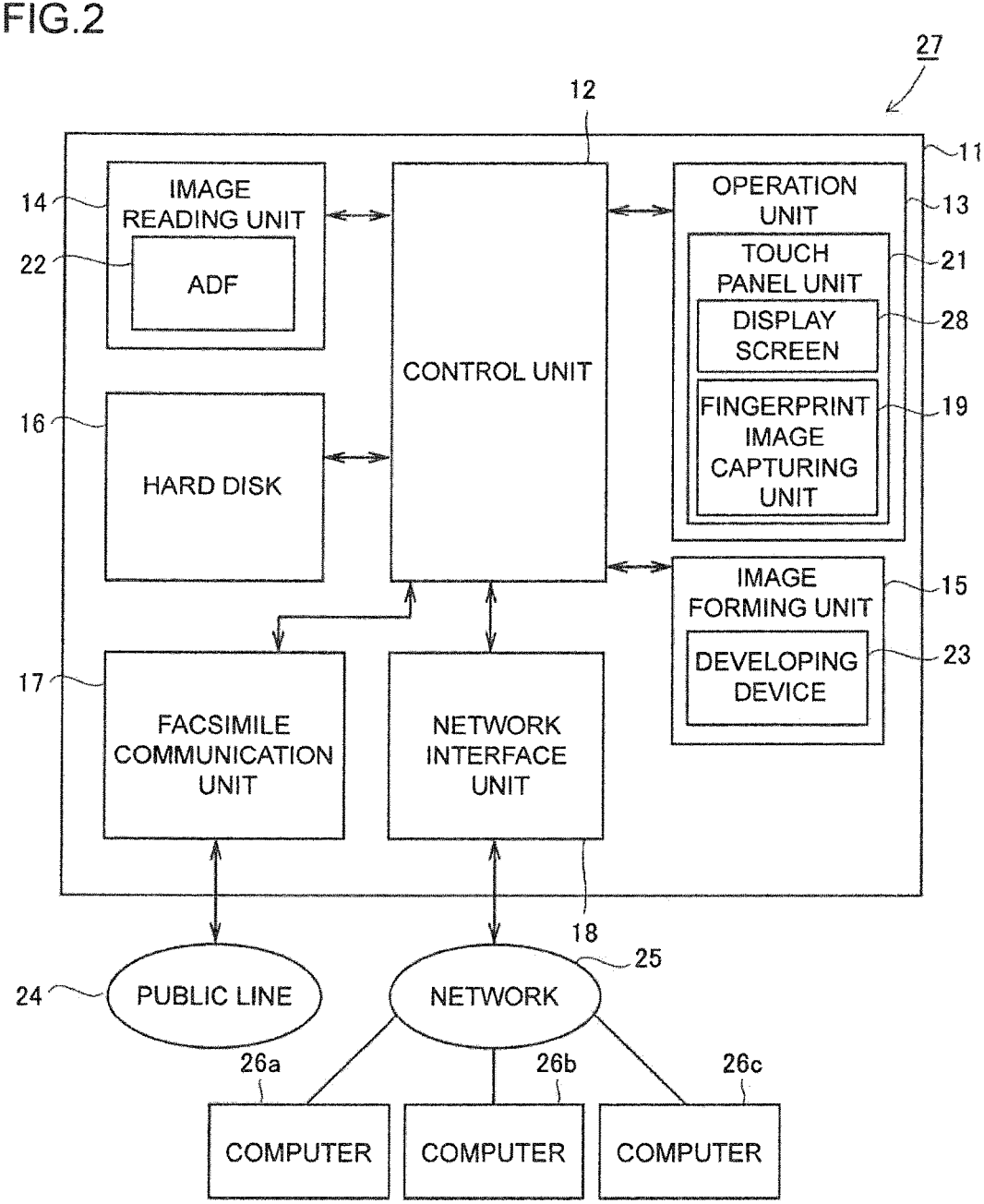
FIG. 2 is a block diagram showing the configuration of the digital multi-function peripheral shown in FIG. 1.

Embodiments of the present disclosure will be described below. FIG. 1 is a schematic view showing the appearance of a digital multi-function peripheral to which an image processing apparatus according to an embodiment of the disclosure is applied. FIG. 2 is a block diagram showing the configuration of the digital multi-function peripheral to which the image processing apparatus according to the embodiment of the disclosure is applied.

Referring to FIGS. 1 and 2, the digital multi-function peripheral 11 includes a control unit 12 that controls the entire digital multi-function peripheral 11, an operation unit 13, an image reading unit 14 that includes an auto document feeder (ADF) 22 used to automatically transfer loaded original documents to a reading site and reads images on the original documents and printed matter, an image forming unit 15 that includes a developing device 23 used to develop images with toner and forms images based on read images or image data transmitted via a network 25, a hard disk 16 that is a storage unit to store transmitted image data and input image forming conditions, a fax communication unit 17 that is connected to a public line 24 and performs fax transmission and reception, and a network interface unit 18 used to connect with the network 25. The operation unit 13 including a touch panel unit 21 allows users to input image forming conditions, such as the number of copies and gradation degrees, and to turn on or off the power source. The touch panel unit 21 includes a display screen 28 that is a display section displaying information issued by the digital multi-function peripheral 11 and instructions input by users. The touch panel unit 21 also detects the position at which the users press down. The digital multi-function peripheral 11 also includes a dynamic random access memory (DRAM) where image data is written in or is read out from, and other components, but their pictorial representations and descriptions are omitted. Arrows in FIG. 2 indicate control signal flows and data flows relating to control operations and images.

The digital multi-function peripheral 11 operates as a copier by causing the image forming unit 15 to form an image from an original document read by the image reading unit 14. In addition, the digital multi-function peripheral 11 operates as a printer by receiving image data transmitted via the network interface unit 18 from computers 26a, 26b, 26c connected to the network 25 and causing the image forming unit 15 to form an image using the image data and print it on paper. In other words, the image forming unit 15 operates as a printing unit for printing required images. Furthermore, the digital multi-function peripheral 11 operates as a facsimile by receiving image data transmitted from a public line 24 through the facsimile communication unit 17 and causing the image forming unit 15 to form images using the image data via the DRAM, or by transmitting image data of an original document, which is read by the image reading unit 14, through the facsimile communication unit 17 to the public line 24. In short, the digital multi-function peripheral 11 has a plurality of functions relating to image processing, such as a duplicating function, or a copying function, a printer function, and a facsimile function. The multi-function peripheral 11 also has a function of minutely setting each of the functions.

An image processing system 27 includes the digital multi-function peripheral 11 configured as described above and the computers 26a, 26b, 26c connected to the digital multi-function peripheral 11 via the network 25. This embodiment shows three computers 26a to 26c. Each of the computers 26a to 26c can make a print request via the network 25 to the digital multi-function peripheral 11 to perform printing. The digital multi-function peripheral 11 may be connected to the computers 26a to 26c with wires, such as local area network (LAN) cables, or may be wirelessly connected. In addition, other digital multi-function peripherals and servers may be connected within the network 25.

Figure 3:
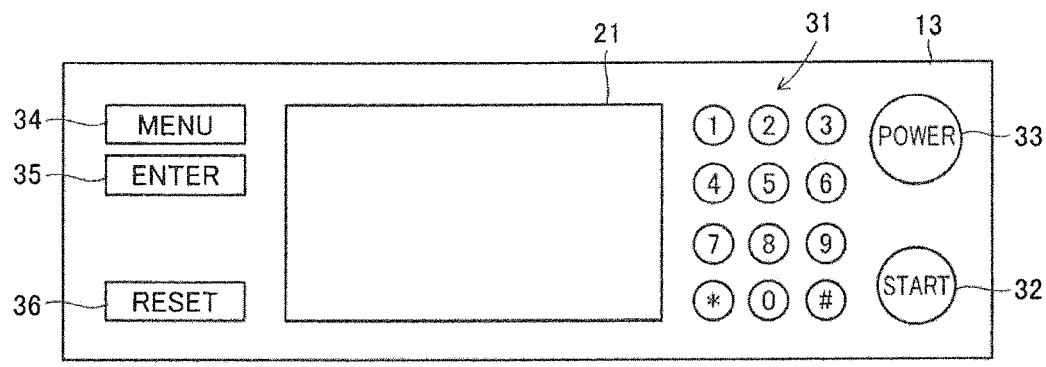
FIG. 3 is an external view schematically showing the configuration of an operation unit provided in the digital multi-function peripheral.

Next, the configuration of the aforementioned operation unit 13 will be further described in detail. FIG. 3 is an external view schematically showing the configuration of the operation unit 13. Referring to FIG. 3, the operation unit 13 includes numeric keys 31 including number keys 0 to 9 used to input the number of copies or the like and symbol keys like "*" and "#", a start key 32 used for instruction to start printing and sending a fax, a power key 33 used to turn on or off the power source of the digital multi-function peripheral 11, a menu key 34 used to select one of the functions, such as a printer function and a copy function, of the digital multi-function peripheral 11, an enter key 35 used for instruction to enter various image forming conditions and users' information, a reset key 36 used to cancel the instructions input by users with the numeric keys 31 and the other keys, and the aforementioned touch panel unit 21. Note that the numeric keys 31, start key 32, power key 33, menu key 34, enter key 35, and reset key 36 are so-called hard keys.

The touch panel unit 21 has a liquid-crystal touch panel function. The liquid-crystal touch panel function imparts to the touch panel unit 21 an ability of inputting operating instructions, such as setting of image forming conditions and a print command, through finger manipulations by a user, including a press, such as a tap and a touch, and also a swipe and a pinch. In this embodiment, for example, a user presses a region on the touch panel unit 21 corresponding to an operating instruction displayed on the display screen 28 to input the operating instruction.

Tapping and swiping, which are translated into operating instructions, are distinguished from each other in accordance with the distance in which a user's finger in a certain size range moves from a point where the finger makes contact with the touch panel unit 21 to a point where the finger is released. Tapping is not always an action in which a user's finger touches and is released from the touch panel at the exactly same position, but it is basically an action in which the user's finger slightly moves from the contact position due to a finger shake and other reasons. In addition, the finger makes contact with the touch panel unit 21 not at a point, but across a region of a certain size. The area and shape of the contact region change in accordance with user's behaviors to the touch panel unit 21, for example, strong pressing, weak pressing, and light touch. The aforementioned displacement of the contact position, contact region, and other conditions are of course different among individual users.

The operation unit 13 can capture an image of a fingerprint of a user at a region the user presses with a finger. More specifically, the operation unit 13 captures a fingerprint in the form of an image at a region where the user's finger touches the touch panel unit 21. The touch panel unit 21 provided in the operation unit 13 includes a fingerprint image capturing unit 19 that captures a user's fingerprint image from a user's finger in contact with the touch panel unit 21.

Figure 4:
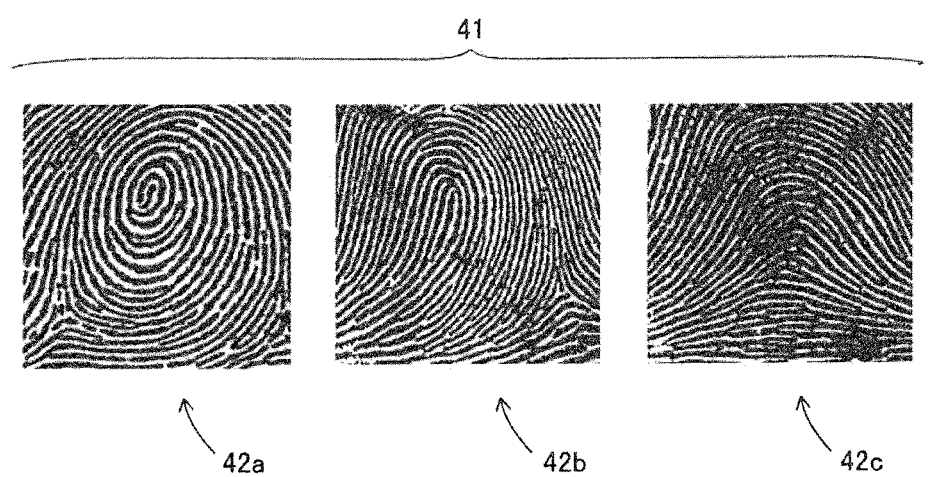
FIG. 4 shows images of three typical fingerprint patterns.

A brief description about typical fingerprint images will be given. FIG. 4 shows images of three typical fingerprint patterns. Referring to FIG. 4, the three fingerprint pattern images 41 include a whorl fingerprint image 42a representing a pattern of circular or spiral ridge lines, a loop fingerprint image 42b representing a pattern of loop ridge lines extending either one of rightward or leftward, and an arch fingerprint image 42c representing a pattern of ridge lines extending from one side to the other and curving. The fingerprints of most users are categorized into these three fingerprint patterns. The fingerprint images 42a to 42c are information stored in the hard disk 16.

Figure 5:
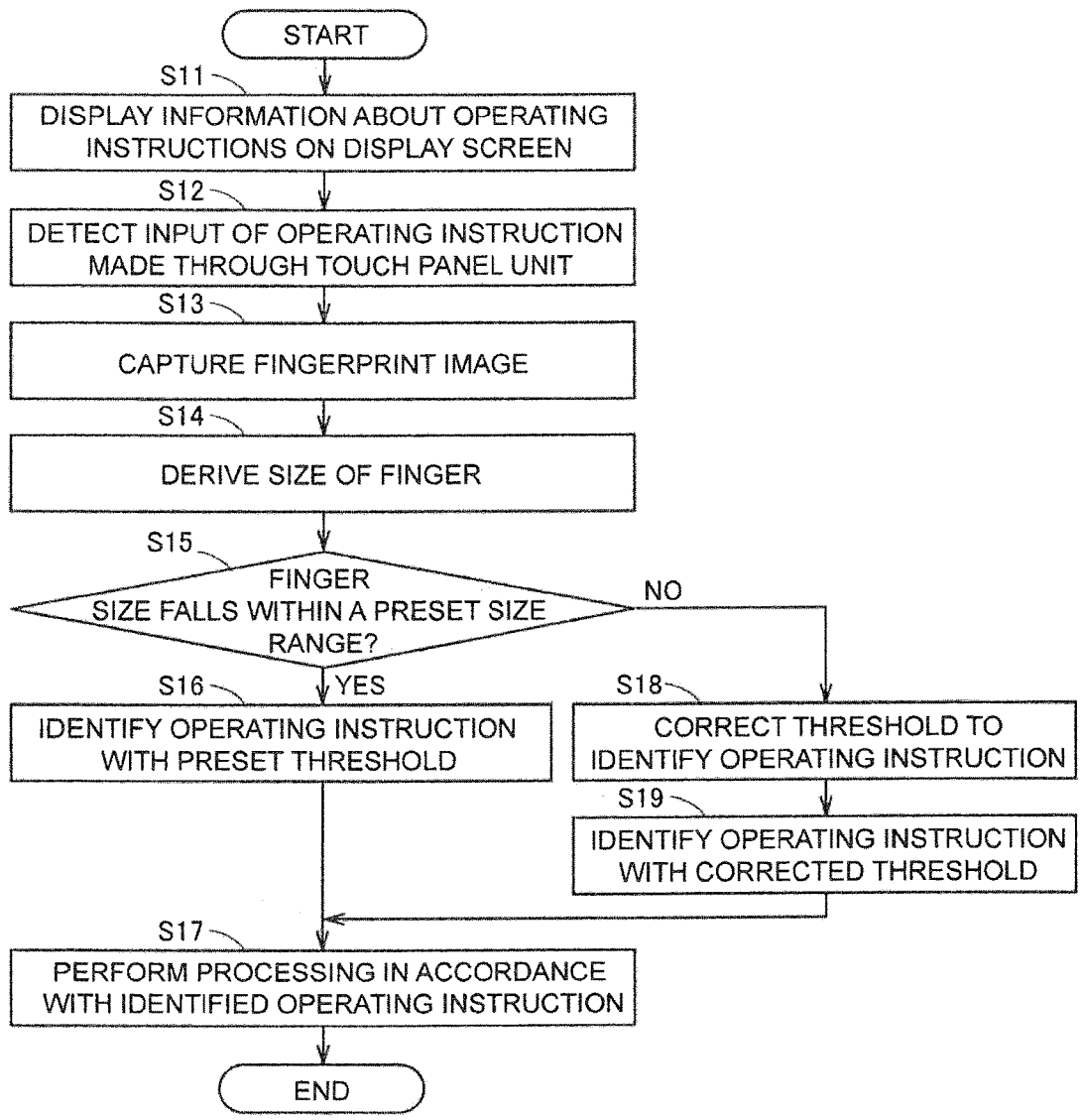
FIG. 5 is a flowchart describing an operational procedure when a user inputs an operation action through a touch panel of the digital multi-function peripheral according to the embodiment of the disclosure.

Next, a description will be made on how a user inputs operating instructions through the touch panel unit 21 of the digital multi-function peripheral 11 according to the embodiment of the disclosure. FIG. 5 is a flowchart describing an operational procedure when the user inputs an operating instruction through the touch panel unit 21 of the digital multi-function peripheral 11 according to the embodiment of the disclosure.

Referring to FIG. 5, firstly, the digital multi-function peripheral 11 displays information about operating instructions on the display screen 28 of the touch panel unit 21 to facilitate the user to input an operating instruction (step S11 in FIG. 5, hereinafter "step" is omitted).

The user presses the touch panel unit 21 in order to input a desired operating instruction. The way of pressing the touch panel unit 21, which is so-called gesture, changes in accordance with the desired operating instruction. The gesture includes tapping, swiping, etc. Then, the control unit 12 detects the input of the operating instruction made through the touch panel unit 21 (S12).

When the touch panel unit 21 is pressed by the user's finger, or when the user's finger makes contact with the touch panel unit 21, the fingerprint image capturing unit 19 captures an image of the user's fingerprint (S13). Then, the size of the user's finger is derived from the captured fingerprint image (S14). In S14, the control unit 12 and some other components operate as a size derivation unit that derives the size of the user's finger having pressed the touch panel unit 21 from the fingerprint image captured by the fingerprint image capturing unit 19.

Figure 6:
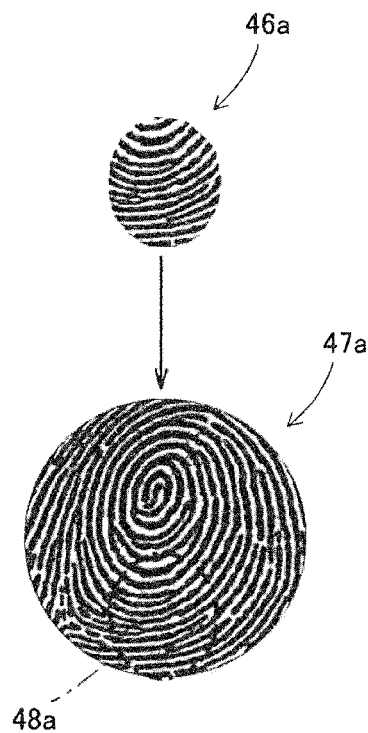
FIG. 6 shows a captured image of a fingerprint of a relatively large finger.
Figure 7:
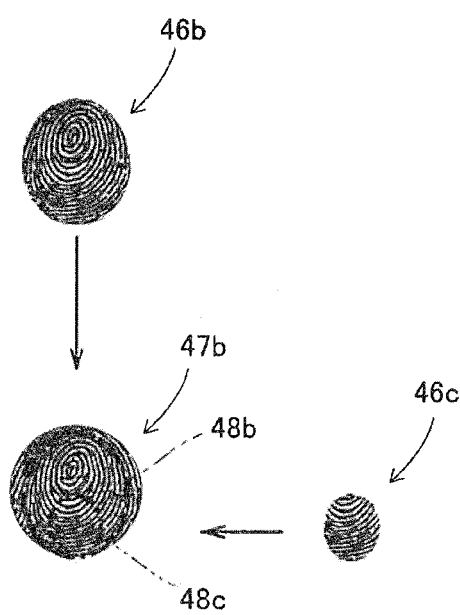
FIG. 7 shows a captured image of a fingerprint of a relatively small finger.

FIGS. 6 and 7 show images of the captured fingerprints. FIG. 6 indicates a case where the finger is relatively large. FIG. 7 indicates a case where the finger is relatively small.

Assume that an image 46a shown in FIG. 6 is captured as an image of a user's fingerprint. The control unit 12 determines which of the images 42a to 42c stored in the hard disk 16 best matches the image 46a, and then determines which part of the best matched fingerprint image corresponds to the image 46a.

In this case, the control unit 12 determines that the captured fingerprint image 46a matches a whorl fingerprint image 47a. Then, the control unit 12 determines that the captured fingerprint image 46a corresponds to a region 48a, which is circled by a dot-and-dash line, of the whorl fingerprint image 47a. In other words, it is determined based on the captured fingerprint image 46a that a user having a whorl fingerprint inputs an operating instruction by using the region 48a of his/her finger, which is circled by the dot-and-dash line. More specifically, the region of his/her finger having pressed the touch panel unit 21 is determined as being a lower part of a pad of his/her finger from the pattern of the captured fingerprint image 46a.

The captured fingerprint pattern, more specifically, for example, the intervals between ridge lines composing the fingerprint, the thickness of the ridge lines, and some other factors are taken into consideration to derive the size of the user's finger. In this case, the relatively wide intervals between the ridge lines and the relatively large thickness of the ridge lines derive that the user's finger is relatively large.

On the other hand, referring to FIG. 7, assume that an image 46b shown in FIG. 7 is captured as an image of a user's fingerprint. In this case, the area of the captured image 46b is almost the same as the area of the aforementioned image 46a. The control unit 12 determines which of the images 42a to 42c stored in the hard disk 16 best matches the image 46b, and then determines which part of the best matched fingerprint image corresponds to the image 46b.

Also in this case, the control unit 12 determines that the captured fingerprint image 46b matches the whorl fingerprint image 47a. The whorl fingerprint image 47b is just a reduced image of the whorl fingerprint image 47a. That is, the whorl fingerprint image 47a and the whorl fingerprint image 47b are similar in shape, and therefore the patterns of those images 47a and 47b are identical even though the intervals between the ridge lines and the thickness of the ridge lines composing the fingerprints are different. Furthermore, the control unit 12 determines that the captured fingerprint image 46b corresponds to an image of a region 48b, indicated by a dot-and-dash line, in the whorl fingerprint image 47b.

Then, the user's finger size is derived from the pattern of the captured fingerprint image 46b. In this case, the relatively narrow intervals between the ridge lines and the relatively small thickness of the ridge lines derive that the user's finger is relatively small.

Assume that the fingerprint image capturing unit 19 captures an image 46c shown in FIG. 7. The captured image 46c has an area smaller than those of the images 46a, 46b. This means that the region of the user's finger that has touched the touch panel unit 21 is small. The control unit 12 determines which of the fingerprint image patterns best matches the image 46c, and then determines which part of the best matched fingerprint image corresponds to the image 46c.

Also in this case, the control unit 12 determines that the captured fingerprint image 46c matches the whorl fingerprint image 47b, and then determines that the fingerprint image 46c corresponds to an image of a region 48c, indicated by a dashed double-dotted line, in the whorl fingerprint image 47b. Furthermore, the control unit 12 determines that the captured fingerprint image 46c corresponds to an image of a region 48c, indicated by a dashed double-dotted line, in the whorl fingerprint image 47b. Also in this case, the relatively narrow intervals between the ridge lines and the relatively small thickness of the ridge lines derive that the user's finger is relatively small. This derivation results in a determination that the fingers in the image 46b and image 46c are identical in size even though the image 46b and image 46c represent fingerprints in different regions, respectively, and the area and shape of the regions are different.

Figure 8:
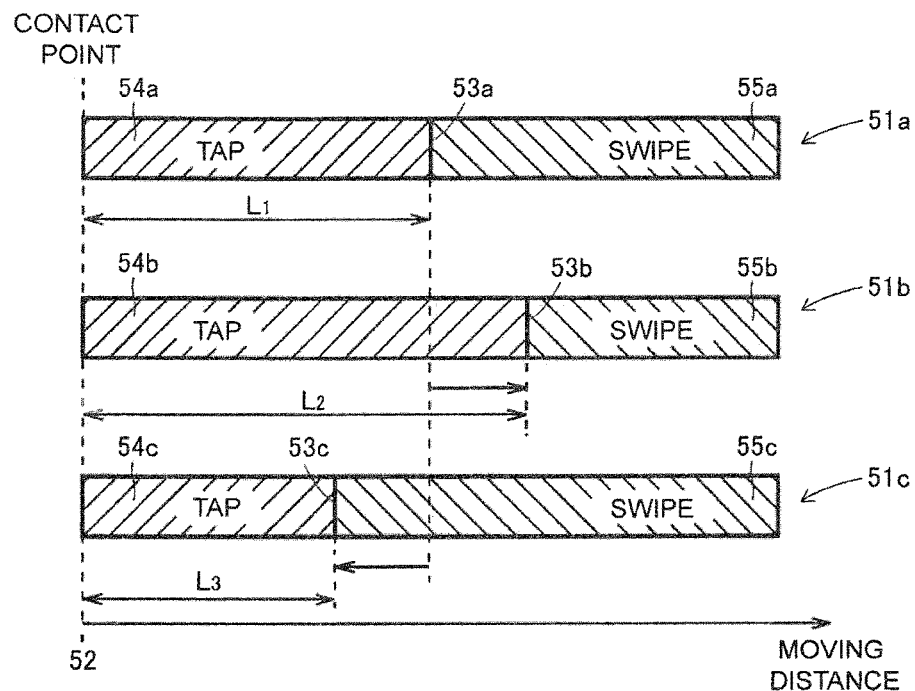
FIG. 8 illustrates criteria to distinguish between a tap and a swipe to be translated as an operating instruction.

Subsequently, it is determined whether the derived finger size falls within a preset size range (S15). FIG. 8 illustrates criteria to distinguish between a tap and a swipe to be translated as an operating instruction. In FIG. 8, the distance in which a finger moves from a point where a finger makes contact with the touch panel unit 21 to a point where the finger is released increases toward the right. A rod-like image 51a extending longer along the direction of the moving distance of a user's finger represents a criterion used for the finger within a preset size range. A rod-like image 51b extending longer along the direction of the moving distance of the user's finger represents a criterion used for the finger over the preset size range. A rod-like image 51c extending longer along the direction of the moving distance of the user's finger represents a criterion used for the finger below the preset size range. The image 51a, used for the finger within the preset size range, has a point 52 that is a position of origin where the finger makes contact, and a distance threshold 53a set a length L1 away from the origin, the threshold 53a being a criterion to distinguish between a tap and a swipe. The distance indicated by the length L1 is, for example, equivalent to 20 pixels as picture elements.

Referring to FIG. 8, if the user's finger size is determined to be within the preset size range (YES in S15), the operating instruction desired by the user is identified with a preset threshold (S16). Specifically, if it is detected that the finger has been released somewhere along the length L1 between the contact point 52 and the distance threshold 53a, the control unit 12 determines that the finger has moved within a range of a region 54a assigned with a tap. Consequently, the operating instruction is determined as being a tap. On the other hand, if it is detected that the finger has been released somewhere over the distance threshold 53a that is set the length L1 away from the contact point 52, the control unit 12 determines that the finger has moved within a range of a region 55a assigned with a swipe. Consequently, the operating instruction is determined as being a swipe.

Subsequently, processing is performed in accordance with the determined operating instruction and is then terminated (S17). More specifically, for example, if the operating instruction is determined as being a tap, an input of a numeral value or the like is made at a region on the display screen 28 corresponding to the position where the user's finger has pressed. If the operating instruction is determined as being a swipe, the display screen 28 may be scrolled.

On the other hand, if the user's finger size is determined to be outside the preset size range (NO in S15), the distance threshold 53a is corrected (S18). A specific procedure for correcting the distance threshold 53a will be described as follows.

If the finger size is determined to be over the preset size range, a distance threshold 53b is set a length L2 away from the contact point 52. The length L2 is longer than the Length L1 set for the threshold 53a. In short, the distance threshold 53a indicated by the length L1 is corrected to the distance threshold 53b indicated by the length L2. The control unit 12 identifies the operating instruction desired by the user on the criterion that has been corrected to the distance threshold 53b (S19).

If it is detected that the finger has been released somewhere along the length L2 between the contact point 52 and the distance threshold 53b, the control unit 12 determines that the finger has moved within a range of a region 54b assigned with a tap. Consequently, the operating instruction is determined as being a tap. On the other hand, if it is detected that the finger has been released somewhere over the distance threshold 53b that is set the length L2 away from the contact point 52, the control unit 12 determines that the finger has moved within a range of a region 55b assigned with a swipe. Consequently, the operating instruction is determined as being a swipe. The distance threshold 53b indicated by the length L2 is equivalent to, for example, 30 pixels, which is only 10 pixels longer than the distance threshold 53a indicated by the length L1.

If the finger size is determined to be below the preset size range, a distance threshold 53c is set a length L3 away from the contact point 52. The length L3 is shorter than the length L1 set for the threshold 53a. In short, the distance threshold 53a indicated by the length L1 is corrected to the distance threshold 53c indicated by the length L3. The control unit 12 identifies the operating instruction desired by the user on the criterion that has been corrected to the distance threshold 53c (S19).

If it is detected that the finger has been released somewhere along the length L3 between the contact point 52 and the distance threshold 53c, the control unit 12 determines that the finger has moved within a range of a region 54c assigned with a tap. Consequently, the operating instruction is determined as being a tap. On the other hand, if it is detected that the finger has been released somewhere over the distance threshold 53c that is set the length L3 away from the contact point 52, the control unit 12 determines that the finger has moved within a range of a region 55c assigned with a swipe. Consequently, the operating instruction is determined as being a swipe. The distance threshold 53c indicated by the length L3 is equivalent to, for example, 10 pixels, which is only 10 pixels shorter than the distance threshold 53a indicated by the length L1.

Subsequently, processing is performed in accordance with the determined operating instruction and is then terminated (S17).

According to the configuration, the fingerprint image capturing unit 19 captures an image of a fingerprint from a finger of a user who touches the touch panel unit 21 to input a desired operating instruction. Then, the size of the user's finger that pressed the touch panel unit 21 is derived from the captured fingerprint image. Subsequently, the operating instruction is controlled according to the derived size of the user's finger. This enables control of operating instructions based on the derived user's finger size, irrespective of differences among individuals and the condition of contact with the touch panel unit. The control of the operating instructions requires no complex mechanism and processing. Thus, the user can input user's desired operating instructions with simple configuration and excellent accuracy. Resultantly, the risk of inputting unintentional operating instructions and losing control of buttons to input desired operating instructions can be reduced. More specifically, the possibility that a swipe made by a user with small fingers is determined as being a tap can be reduced. The possibility that a tap made by a user with large fingers is determined as being a swipe can be also reduced. In addition, the derivation of finger size is made irrespective of the area and shape of the finger in contact with the touch panel as described above, and therefore there is no problem even if the same user touches the panel in different manners.

In this embodiment, control of the operating instruction is made by correcting the threshold of a gesture made by a user through manipulation of the touch panel unit 21 based on the size of the user's finger derived by the size derivation unit. Thus, the user can input user's desired operating instructions with simple configuration and excellent accuracy.

In addition, the control of the operating instruction is made by comparing a fingerprint image captured by the fingerprint image capturing unit with the three fingerprint pattern images stored in the hard disk 16, thereby enabling input of user's desired operating instructions with simpler configuration. This configuration eliminates users having to register their own individual fingerprint images to input operating instructions.

Alternatively, the control of the operating instruction can be made by examining fingerprint images every time they are captured and by referring to the examination results. Specifically, in an example, if the intervals between the ridge lines composing a fingerprint are equal to or longer than a predetermined length, or if the thickness of the ridge lines is equal to or larger than a predetermined value, the threshold used to identify an operating instruction may be corrected irrespective of the type and pattern of the fingerprint.

Although the threshold to be used to identify an operating instruction is corrected based on the finger size derived from the fingerprint image in the aforementioned embodiment, the present disclosure is not limited thereto, and can be configured so as to, when a user makes contact with the touch panel unit with a finger, derive a contact position on the finger from a fingerprint image and correct the coordinates of the contact position. Specifically, the digital multi-function peripheral 11 can be configured to include a touch panel unit 21 that includes a display section for displaying information about an operating instruction for a user and detects the condition of contact with a user's finger to accept an input of the operating instruction, a fingerprint image capturing unit 19 that captures a user's fingerprint image when the touch panel unit 21 is pressed by the user's finger, a position derivation unit that derives a position on the user's finger pressing the touch panel unit 21 from the fingerprint image captured by the fingerprint image capturing unit 19, and a control unit that controls the operating instruction based on the position on the user's finger derived by the position derivation unit.

Figure 9:
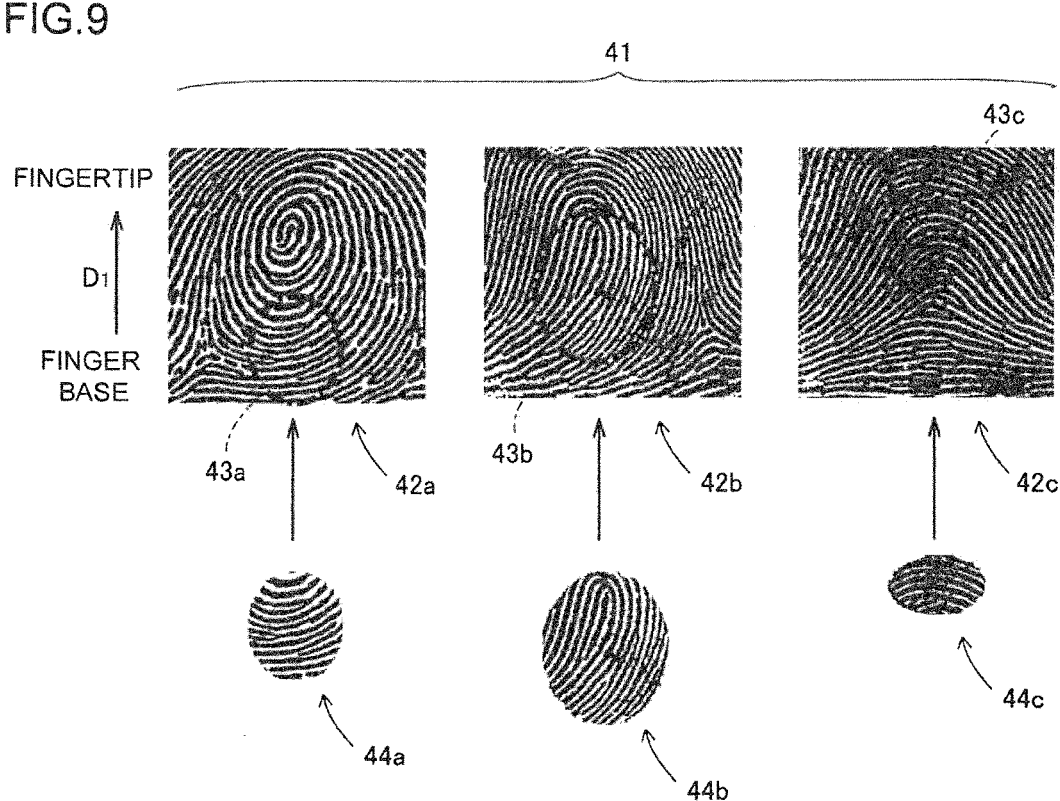
FIG. 9 shows captured fingerprint images.

FIG. 9 shows captured fingerprint images. FIG. 9 also shows a whorl fingerprint image 42a, a loop fingerprint image 42b, and an arch fingerprint image 42c shown in FIG. 4. In FIG. 9, the patterns of the fingerprint images 42a to 42c are oriented with an arrow D1 pointing toward the tip of the finger, while the other side of the arrow D1 indicates the base of the finger, or more specifically, the first joint of the finger.

Referring to FIG. 9, if the fingerprint image capturing unit 19 captures a fingerprint image 44a, the fingerprint image 44a is determined to match an image of a region 43a enclosed by a dot-and-dash line in the whorl fingerprint image 42a based on the intervals between the ridge lines composing the fingerprint, the thickness of the ridge lines, the pattern of the ridge lines forming the fingerprint, and other conditions. The region 43a is positioned near the first joint on the side of the base of the finger. From the fingerprint image 44a, it can be determined that a user having a whorl fingerprint has pressed the touch panel unit 21 with a lower part of a finger pad.

If the fingerprint image capturing unit 19 captures a fingerprint image 44b, the fingerprint image 44b is determined to match an image of a region 43b enclosed by a dot-and-dash line in the loop fingerprint image 42b based on the intervals between the ridge lines composing the fingerprint, and other conditions. The region 43b is positioned near the center of the finger pad. From the fingerprint image 44b, it can be determined that a user having a whorl fingerprint has pressed the touch panel unit 21 with just the finger pad.

If the fingerprint image capturing unit 19 captures a fingerprint image 44c, the fingerprint image 44c is determined to match an image of a region 43c enclosed by a dot-and-dash line in the arch fingerprint image 42c based on the intervals between the ridge lines composing the fingerprint, and other conditions. The region 43c is positioned near the fingertip or a tip of the fingernail. From the fingerprint image 44c, it can be determined that a user having an arch fingerprint has pressed the touch panel unit 21 with the fingertip.

Based on these determination results, the coordinates of a position on the user's finger that has pressed the touch panel unit 21 can be corrected. Thus, the user can input his/her desired operating instructions more accurately.

Figure 10:
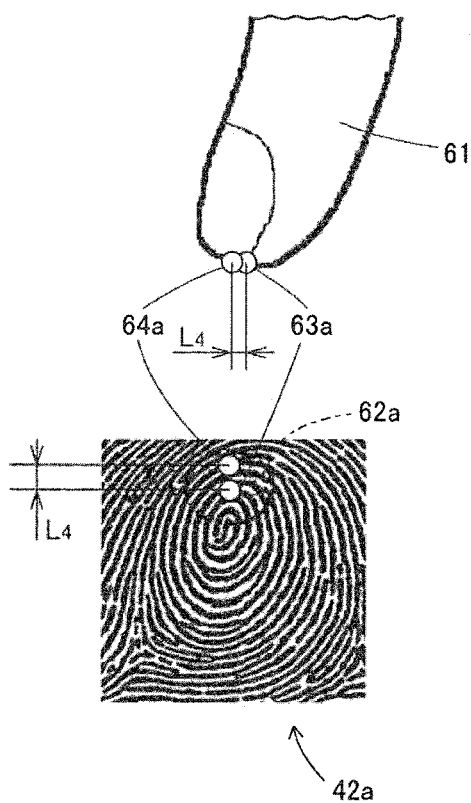
FIG. 10 illustrates a case where a user presses a touch panel unit with a tip of a user's finger.
Figure 11:
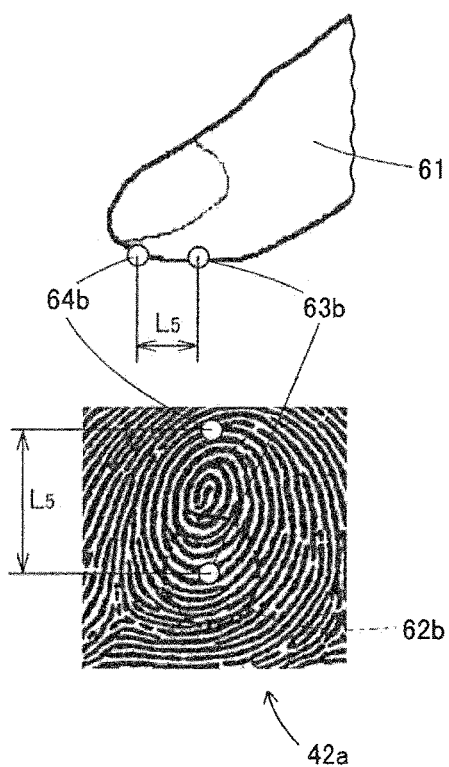
FIG. 11 illustrates a case where the user presses the touch panel unit with a pad of the user's finger.

A specific configuration will be described as an example. FIG. 10 illustrates a case where a user presses a touch panel unit 21 with a tip of a user's finger FIG. 11 illustrates a case where a user presses the touch panel unit 21 with a pad of the user's finger. Both drawings schematically depict a part of a finger 61, in a reduced scale, on the upper side of the drawings in order to provide a clear understanding. Both drawings also show the whorl fingerprint image 42a on the lower side thereof.

Referring to FIG. 10, when a user makes contact with the touch panel unit 21 with a tip of a finger 61 in an upright posture in order to input an operating instruction, the user may intend to use a point 64a of the finger 61 to touch the touch panel unit 21; however, the user may actually press the touch panel unit 21 with a point 63a of the finger 61. The point 64a is positioned differently from the point 63a, and the difference in distance is represented by a length L4. The point 63a that is actually used to press the touch panel unit 21 is located at almost the center of a region 62a, enclosed by a dot-and-dash line, with which the finger 61 has made contact. The length L4, or the difference between the point 64a, which is intended to be used to touch for input of the operating instruction, and the point 63a, which is actually used to press, is relatively short. Accordingly, it can be determined as described above that the touch panel unit 21 has been pressed by a fingertip based on the fingerprint pattern of the region 62a containing the actually used point 63a. In this case, the coordinates of the point 63a are corrected with a relatively small correction value so as to obtain coordinates of a proper input point. Specifically, the correction of the coordinates for the input point is made in consideration that the intended point 64a tends to be located near the tip of a fingernail with respect to the actually used point 63a and the displacement of 0 to a few mm (millimeters) to be used as the actual correction value.

On the other hand, referring to FIG. 11, when a user makes contact with the touch panel unit 21 with a pad of a finger 61 in a lying posture in order to input an operating instruction, the user may intend to use a point 64b of the finger 61 to touch the touch panel unit 21; however, the user may actually use a point 63b of the finger 61 to press the touch panel unit 21. The point 64b is positioned differently from the point 63b, and the difference in distance is represented by a length L5. The length L5, or the difference between the point 64b, which is intended to be used to touch for input of the operating instruction, and the point 63b, which is actually used to press, is relatively long. Accordingly, it can be determined that the touch panel unit 21 has been pressed by a pad of the finger 61 based on the fingerprint pattern of a region 62b containing the actually used point 63b. In this case, the coordinates of the point 63a are corrected with a relatively large correction value so as to obtain coordinates of a proper input point. Specifically, the correction of the coordinates for the input point is made in consideration that the intended point 64b tends to be located near the tip of a fingernail with respect to the actually used point 63b and the displacement of 10 to a few tens of mm (millimeters) to be used as the actual correction value.

The control unit 12 reduces the correction value to correct the displacement of the point of the user's finger that actually makes contact with the touch panel unit 21 as the point derived by the position derivation unit is closer to the fingertip, thereby controlling the operating instruction. Thus, the user can input his/her desired operating instructions with simple configuration and excellent accuracy. For example, if the correction value has been already set as personal information of the user, the user needs to go back to the login screen and performs re-login to input the operating instruction or to perform other operations; however, this embodiment of the present disclosure can eliminate such complicated operations for the user.

In the above-described embodiment, the area and shape of the regions 62a, 62b change depending on how much pressure is applied by the finger 61 in contact with the touch panel unit 21 and what part of the finger 61 touches the touch panel unit 21. However, determination of the finger part making contact with the touch panel unit 21 is made based on the fingerprint pattern, and therefore the position on the user's finger can be derived with high accuracy irrespective of the area and shape of the region of the finger in contact with the touch panel unit 21.

In the above-described embodiments, images of three fingerprint patterns are stored in a hard disk; however, the present disclosure is not limited thereto, and images of more than three fingerprint patterns can be stored in the hard disk. By comparing the increased number of fingerprint pattern images, the operating instruction can be controlled. Alternatively, the fingerprint images stored in the hard disk may include at least one of a whorl fingerprint image, loop fingerprint image, and arch fingerprint image. In addition, the storage unit that holds the images of different fingerprint patterns may be provided to the digital multi-function peripheral externally. This allows image comparison with fingerprint images stored in other storage media in the form of data.

Although the above-described embodiments describe the case where users input operating instructions into an image processing apparatus, which is a digital multi-function peripheral, the present disclosure is not limited thereto and can be applied to touch panel devices, with a touch panel unit through which the operating instructions are input, provided to terminal devices, such as smart phones and tablet terminals.

The touch panel device can be configured to include a touch panel unit that includes a display section displaying information about an operating instruction for a user and detects the condition of contact with a user's finger to accept an input of the operating instruction, a fingerprint image capturing unit that when the touch panel unit is pressed by the user's finger, captures an image of a fingerprint of the user's finger pressing the touch panel unit, a size derivation unit that derives a size of the user's finger having pressed the touch panel unit from the fingerprint image captured by the fingerprint image capturing unit, and a control unit that controls the operating instruction based on the size of the user's finger derived by the size derivation unit.

According to the touch panel device, the fingerprint image capturing unit captures an image of a fingerprint from a finger of a user who touches the touch panel unit to input a user's operating instruction. Then, the size of the user's finger that has pressed the touch panel unit is derived from the captured fingerprint image. Subsequently, the operating instruction is controlled according to the derived size of the user's finger. This enables control of operating instructions based on the derived user's finger size, irrespective of differences among individuals and the condition of contact with the touch panel unit. The control of the operating instructions requires no complex mechanism and processing. Thus, the user can input his/her desired operating instructions with simple configuration and excellent accuracy.

The touch panel device can be also configured to include a touch panel unit that includes a display section displaying information about an operating instruction for a user and detects the condition of contact with a user's finger to accept an input of the operating instruction, a fingerprint image capturing unit that when the touch panel unit is pressed by the user's finger, captures an image of a fingerprint of the user's finger pressing the touch panel unit, a position derivation unit that derives a position on the user's finger having pressed the touch panel unit from the fingerprint image captured by the fingerprint image capturing unit, and a control unit that controls the operating instruction based on the position on the user's finger derived by the position derivation unit.

According to the touch panel device, the fingerprint image capturing unit captures an image of a fingerprint from a finger of a user who touches the touch panel unit to input a user's operating instruction. Then, the position on the user's finger that has pressed the touch panel unit is derived from the captured fingerprint image. Subsequently, the operating instruction is controlled according to the derived position on the user's finger. This enables control of operating instructions based on the derived position on the user's finger, irrespective of differences among individuals and the condition of contact with the touch panel unit. The control of the operating instructions requires no complex mechanism and processing. Thus, the user can input his/her desired operating instructions with simple configuration and excellent accuracy.

Some touch panel devices and image processing apparatuses include a preinstalled fingerprint authentication system for user authentication. The present disclosure can construct a more efficient system with the fingerprint authentication system.

It should be understood that the embodiments and examples disclosed herein are illustrative and non-restrictive in every respect. The scope of the present disclosure is defined by the terms of the claims, rather than by the foregoing description, and is intended to include any modifications within the scope and meaning equivalent to the terms of the claims.

The touch panel device and image processing apparatus according to the disclosure are efficiently used especially to address the requirement to accurately input operating instructions desired by users with simple configuration and excellent accuracy.

What is claimed is:

1. A touch panel device comprising:
   a touch panel unit that includes a display section displaying information about an operating instruction for a user and detects the condition of contact with a user's finger to accept an input of the operating instruction;
   a fingerprint image capturing unit that when the touch panel unit is pressed by the user's finger, captures an image of a fingerprint of the user's finger pressing the touch panel unit;
   a size derivation unit that derives a size of the user's finger having pressed the touch panel unit from the image of the fingerprint captured by the fingerprint image capturing unit; and
   a control unit that controls the operating instruction based on the size of the user's finger derived by the size derivation unit.

2. The touch panel device according to claim 1, wherein the control unit controls the operating instruction by correcting a threshold used to identify the operation instruction that is input through the touch panel unit based on the size of the user's finger derived by the size derivation unit.

3. The touch panel device according to claim 2, wherein the control unit determines that the operating instruction is a tap if the distance in which the user's finger moves from a point where the user's finger makes contact with the touch panel unit does not exceed the threshold, while determining that the operating instruction is a swipe if the distance exceeds the threshold.

4. The touch panel device according to claim 1, comprising
   a storage unit that stores images of a plurality of fingerprint patterns, wherein
   the control unit controls the operating instruction by comparing the image of the fingerprint captured by the fingerprint image capturing unit with the images of the fingerprint patterns stored in the storage unit.

5. The touch panel device according to claim 4, wherein
   the images of the fingerprint patterns stored in the storage unit include at least one of a whorl fingerprint image, a loop fingerprint image, and an arch fingerprint image.

6. An image processing apparatus comprising:
   the touch panel device according to claim 1, and
   an image processing unit that performs image processing in accordance with the operating instruction input through the touch panel device.

7. A touch panel device comprising:
   a touch panel unit that includes a display section displaying information about an operating instruction for a user and detects the condition of contact with a user's finger to accept an input of the operating instruction;
   a fingerprint image capturing unit that when the touch panel unit is pressed by the user's finger, captures an image of a fingerprint of the user's finger pressing the touch panel unit;
   a position derivation unit that derives a position on the user's finger having pressed the touch panel unit from the image of the fingerprint captured by the fingerprint image capturing unit; and
   a control unit that controls the operating instruction based on the position on the user's finger derived by the position derivation unit.

8. The touch panel device according to claim 6, wherein
   the control unit control the operating instruction by reducing a correction value to correct a displacement of the position on the user's finger that makes contact with the touch panel unit as the position on the user's finger derived by the position derivation unit is closer to a tip of the user's finger.

9. An image processing apparatus comprising:
   the touch panel device according to claim 7, and
   an image processing unit that performs image processing in accordance with the operating instruction input through the touch panel device.

* * * * *